United States Patent [19]

Sun et al.

[11] Patent Number: 5,961,712
[45] Date of Patent: *Oct. 5, 1999

[54] METHOD FOR MAKING SHOTCRETE AND SUCH COMPOSITIONS

[75] Inventors: Henghu Sun; Shuqin Li, both of Sudbury, Canada; Weirui Xu, Beijing, China

[73] Assignee: Sungeric International, Inc., Ontario, Canada

[*] Notice: This patent issued on a continued prosecution application filed under 37 CFR 1.53(d), and is subject to the twenty year patent term provisions of 35 U.S.C. 154(a)(2).

[21] Appl. No.: 08/683,460

[22] Filed: Jul. 18, 1996

[51] Int. Cl.[6] .............................. C04B 7/32; C04B 7/345
[52] U.S. Cl. .................. 106/696; 106/694; 106/695; 106/705; 106/706; 106/708; 106/710; 106/772; 106/773; 106/774; 106/776; 106/778; 106/779; 106/775; 106/781; 106/788
[58] Field of Search ..................................... 106/695, 696, 106/735, 772, 775, 778, 788, 795, 694, 705, 706, 708, 710, 773, 774, 776, 779, 781

[56] References Cited

U.S. PATENT DOCUMENTS

| | | |
|---|---|---|
| 3,819,389 | 6/1974 | Uchikawa et al. ............... 106/735 |
| 4,350,533 | 9/1982 | Galer et al. ............... 106/695 |
| 4,804,563 | 2/1989 | Hillemeier et al. . |
| 4,931,098 | 6/1990 | Danielssen et al. . |
| 5,076,852 | 12/1991 | Bloys et al. . |
| 5,114,487 | 5/1992 | Gartshore et al. ............... 106/695 |
| 5,149,370 | 9/1992 | Olaussen et al. . |
| 5,158,613 | 10/1992 | Sargeant et al. . |
| 5,234,497 | 8/1993 | Crocker . |
| 5,273,579 | 12/1993 | Tanaka et al. . |
| 5,389,144 | 2/1995 | Burge et al. . |
| 5,401,538 | 3/1995 | Perito . |
| 5,413,819 | 5/1995 | Drs . |

FOREIGN PATENT DOCUMENTS

ZL90103141  1/1990  China .

OTHER PUBLICATIONS

Publication from Beijing Gaoshui Institute of Mining Engineering & Material (Date Unknown).

Primary Examiner—Michael Marcheschi
Attorney, Agent, or Firm—Birch, Stewart, Kolasch & Birch, LLP

[57] ABSTRACT

The invention provides cementitious mixtures, particularly for use as shotcrete binding materials. The resultant shotcrete has characteristics of rapid setting as low as 5 to 10 minutes, high early compressive strength (5 to 25 MPa in two hours curing, 20 to 60 MPa in one day curing), high permanent compressive strength and negligible shrinkage. High aluminous content roasted cement clinkers with gypsum, anhydrite, lime, limestone, bentonite and other additives are used in the mixtures. There are especially suitable for use in shotcrete engineering. The methods of using the improved shotcrete are similar to those of using Portland cement, with significantly decreased rebound at site.

4 Claims, 9 Drawing Sheets

5,961,712

METHOD FOR MAKING SHOTCRETE AND SUCH COMPOSITIONS

BACKGROUND OF THE INVENTION

1. Field of the Invention

The present invention relates to cement and concrete products in general, and in particular to methods for making cementitious compositions having cement, gypsum, sand and/or gravel and water as ingredients thereof. More particularly, the cementitious compositions have one or more of a range of additives which produce final compositions, adjusted in terms of setting spread, strength, shrinkage and so forth, to fit prescribed specifications. More particularly still, the present method and product are suitable for application to the mining and like industries and provide fast setting, high strength and low rebound shotcrete. (For purposes of economy of nomenclature the shotcrete of the present invention will be termed "Suncrete", which is a trade mark of the assignee of the present invention).

2. Prior Art of the Invention

In the Dictionary of Civil Engineering (Penguin, 1991), the entry under "shotcrete" reads:

"Gunite with aggregate larger than 10 mm, a development of the late 1950s from the NATM (new Austrian tunnelling method) for lining tunnels in two stages, using shotcrete immediately after blasting, with aggregate up to 30 mm and an accelerating admixture. Steel mesh has been used to strengthen the shotcrete, and sometimes roof bolts also, but some users have replaced these by steel-fibre reinforcement. The mix can be made to set in as little as 15 minutes, providing safe cover for workers in large excavations such as the Milan-Rome motorway, 24 m (79 ft) wide, driven in the 1960s."

"Gunite", as distinct from shotcrete, is defined as having aggregate smaller than 10 mm, while shotcrete uses aggregate larger than 10 mm. In this specification, however, the term "shotcrete" will be used to include all classes irrespective of aggregate size.

Several United States patents are directed to shotcrete, spray concrete compositions, and the like.

U.S. Pat. No. 4,804,563 granted Feb. 14, 1989, to Hillemeier et al. discloses a spray concrete composition which is sprayed with driving-air pressure having its setting time accelerated by incorporation in the driving air of amorphous silica dust having an inner surface (specific surface area) of at least 25 $m^2/g$.

U.S. Pat. No. 4,931,098 granted Jun. 5, 1990, to Danielssen et al. discloses a method for adding silica fume to a dry shotcrete mixture wherein the silica fume is added together with the water supplied to the dry mixture in the spray nozzle.

U.S. Pat. No. 5,076,852 granted Dec. 31, 1991, to Bloys et al. discloses a cement method and composition for cementing a well penetrating subterranean formations and aqueous based drilling fluid containing at least one cement retarder characterized by a major proportion of the drilling fluid from the well as it was drilled; water; a lesser proportion of dry cementitious material; a minor amount of a dispersant that does not effect satisfactory set cement within an acceptable time interval; and an accelerator selected from the class consisting of acetic acid; the first 4 carbon esters thereof; acetamide; monoethanolanine; and diethanolamine. The first 4 carbon esters are the methyl; ethyl; propyl, both normal and isopropyl; and butyl ester, normal, isobutyl and teriy butyl.

U.S. Pat. No. 5,149,370 granted Sep. 22, 1992, to Olaussen et al. discloses cement compositions which have improved properties such as increased stability, reduced settling tendencies, enhanced, fluid loss properties and the like and method of using such cement compositions are provided. The cement compositions are comprised of water, hydraulic cement and an aqueous colloidal silicic acid suspension wherein the colloidal silicic acid particles have a specific surface area in the range of from about 50 $m^2/g$ to about 1000 $m^2/g$.

U.S. Pat. No. 5,158,613 granted Oct. 27, 1992, to Sargeant et al. discloses hydraulic high density cement slurry, especially for cementation of oil/gas wells. The slurry contains 30–45 weight % microsilica based on the cement weight and water to a density of 1.9–3.5 $g/cm^3$. if desired there can be added dispersant, retarder and weighting agent. Microsilica acts as a fluid-loss preventing agent. The addition of microsilica prevents strength retrogression at temperatures above 120° C. and acts as a mechanical stabilizer for the cement slurries. A method for production of the cement slurry is also described.

U.S. Pat. No. 5,234,497 granted Aug. 10, 1993, to Crocker discloses a fast setting cementitious composition which upon hydration with water forms a paste-like slurry useful in stopping leaks in the walls of cement pipes. The cementitious composition comprises a dry mixture of a hydraulic cement component having a first Portland cement constituent and a second calcium aluminate constituent, an aggregate component and a lime component. Upon hydration with 23 wt. % water, the resulting slurry has an initial Vicat setting time within the range of 1–5 minutes and a final Vicat setting time of no more than 6 minutes. The cement component contains the first and second cement constituents in weight ratios within the range of 3:2–2:3. The lime component is present in an amount within the range of 1–4 wt. %

In effecting the repair of a water leak, a paste-like slurry is formed from water and the dry cementitious composition. The cementitious paste is supplied to the repair site. Sufficient force is applied against the paste to hold it against the repair site while allowing the cement to set to provide sufficient strength to offset the hydraulic gradient and stop the water leakage.

U.S. Pat. No. 5,273,579 granted Dec. 28, 1993, to Tanaka et al. discloses a quick setting composition capable of obtaining satisfactory strength developability irrespective of the fluctuation of the ingredients in a metallurgical slag, excellent in the strength developability at cold temperature, easy for coagulation control and inexpensive as well, which contains a cement ingredient comprising portland cement and/or mixed cement, 2 to 50% by weight at the integral ratio of a quick setting agent prepared by adding 3 to 20% by weight of an alkali carbonate at an internal ratio to a mixture comprising 40 to 95% by weight of a finely powdery metallurgical slag and 5 to 60% by weight of II-type anhydrous gypsum, based on the cement ingredient, and 0.1 to 5% by weight of a coagulation controlling agent comprising an organic acid type coagulation retarder and an alkali sulfate and/or calcium salt based on the total weight of the cement ingredient and the quick setting ingredient. U.S. Pat. No. 5,389,144 granted Feb. 14, 1995, to Burge et al. discloses admixtures for spray concrete or mortar which contain silicic acid sol or consist of it, are used for the processing of spray concrete or mortar according to the dry or the wet method. Said admixtures lead to a clear reduction of dust formation and of rebound. With the processing of spray concrete or mortar the addition of the inventive admixtures takes place preferably during the spraying, for example at the spray nozzle.

U.S. Pat. No. 5,413,819 granted May 9, 1995, to Drs discloses that the storage and processing times of sprayed concrete can be significantly extended by the addition of a retarder, a chemical compound which is capable of chelating with chemical ions. Preferred retarders are phosphonic acid derivatives which have at least one amino and/or hydroxyl group. The retarder can be used for both wet- and dry-sprayed concrete, the usual accelerators can be used for activation, and the strength is not adversely affected.

U.S. Pat. No. 5,401,538 granted Mar. 28, 1995, to Perito discloses sprayable fireproofing compositions for structural members such as steel columns are provided, as well as a method of applying multiple coatings thereof. The compositions comprise a Portland cement-based material, stucco, a high density aggregate and an accelerator. The compositions eliminate the long setting times typical of Portland cement-based materials, and improve the hangability thereof. The product is produced by dry blending a mixture of Portland cement, a high density aggregate, stucco (calcium sulfate and hemi-hydrate) and optionally, a stucco set retarder and shredded polystyrene aggregate. Upon the addition of water, sprayable slurries are formed which can be pumped to the point of application. An accelerator is added in close proximity to the point of injection. The slurries adhere to the structural member in the slurried state and after setting to provide excellent fire and heat protection. Because of the relative quick setting time of the slurry upon spray application, multiple coatings can be applied within the same working day.

Chinese Patent Application No. ZL90103141.0 filed in 1990 discloses high water content (90% water by volume) cementitious slurry for filling and stowing in mines uses cement clinkers such as sulpho-aluminate cement clinker, sulpho-ferrite-aluminate cement clinker, sulpho-fluo-aluminate cement clinker and other aluminate cement clinkers. However, such slurry is not suitable for use in shotcrete and the like applications. The major minerals in these cement types are:

| | |
|---|---|
| sulpho-aluminate cement: | $3CaO.3Al_2O_3.CaSO_4\text{-}\beta\text{-}2CaO.SiO_2$; |
| sulpho-ferrite-aluminate cement: | $3CaO.3Al_2O_3.CaSO_4\text{-}\beta\text{-}2CaO.SiO_2$ and $4CaO.Al_2O_3.Fe_2O_3$; |
| sulpho-fluo-aluminate cement; | $3CaO.3Al_2O_3.CaSO_4\text{-}\beta\text{-}2CaO.SiO_2$ and $11CaO.7Al_2O_3.CaF_2$; |
| high-alumina cement: | $CaO.Al_2O_3$ and $12CaO.7Al_2O_3$ |

SUMMARY OF THE INVENTION

The present invention endeavours to provide a systematic method for making, and cementitious mixtures suitable, in particular, for application as shotcrete in the mining industry, but in general also in other construction applications.

In conventional shotcrete technology, a large portion (larger than 70%) of the cement binding material is made from roasted clinkers, which are high cost materials due to roasting. The setting time and workability are adjusted by means of high cost additives. In addition to cost disadvantages, there is some loss of strength and stability due to the use of the additives.

The present invention allows the increase of un-roasted ingredients, such as gypsum anhydrite, in the binding material. The setting time can be adjusted by means of the ratio of proportions of the roasted cement clinker, gypsum and lime. The result is improved shotcrete in cost, setting time, strength, and ease of adjustment to fit required specifications. Long term stability is also improved.

One problem in making shotcrete is the trade-off between setting time and long term strength. To shorten setting time an accelerator such as Na CO containing material is used. However, this decreases long term strength significantly. In the present invention additives are produced by mixing accelerators (such as Na CO containing materials) together with retardants (such as sugars and molasses). The improved shotcrete has shorter setting time, increased strength, and long term stability.

Another aspect of the present invention is the advantageous use of lime, which in conventional shotcrete technology is undesirable because it decreases strength and stability and is generally kept below 0.5%. As may be seen from "Test Example 1"later on, lime (which is inexpensive) is used to advantage. Without the use of lime, and using 85% to 95% sulpho-aluminate cement clinker, 5% to 15% gypsum, and mixing with sand and water at 22° C. with a ratio of 1:2.5 (sand):0.5 (water), the resultant setting time is 45 to 120 minutes, and the 1 to 2 hour curing strength practically nil, while the 4 hour curing strength is 0.5 to 2 MPa (Mega Pascals).

Thus, in one broad aspect of the present invention, a shotcrete mixture, before adding sand, gravel or water, is provided comprising up to 30% lime by weight.

In a further aspect, the present invention provides shotcrete with a larger range of permissible water-to-cementitious mixture ratio of 0.35 to 1.0, as opposed to the prior art, where the ratio is 0.35 to 0.6. As an example, a ratio of cementitious mixture according to the present invention-to-sand-to-water of 1:2.5:(0.6 to 1.0) would result in shotcrete with a setting time of 1 to 5 minutes, 2 hours curing strength of 9 to 16 MPa, and 6 hour curing strength of 12 to 30 MPa.

Some of the cementitious mixtures of the present invention are characterized by fast setting times, high compressive strength within hours of curing time, and low rebound or shrinkage, while at the same time being low cost for shotcrete. Moreover, the mixtures of the present invention are also suitable for use in winter construction, seaport construction, irrigation engineering, road construction, flood damning, industrial waste containment, and other such applications.

Accordingly, the present invention provides a systematic method for producing an intermediate cementitious mixture, comprising:

(a) mixing together at least one ingredient from a first basic group of ingredients comprising: all sulpho-aluminate cement clinkers and other high alumina cement clinkers, at least one ingredient from a second basic group of ingredients comprising: gypsum; anhydrite; hemihydrate gypsum, and at least one ingredient from a third basic group of ingredients comprising: lime and hydrated lime;

(b) adding to the mixture in (a) with a ratio not exceeding 20% by weight at least one additive ingredient from a first group of additive ingredients comprising: tartaric acid; tartarate-salts; boric acid; borate-salts; carbonates; lignosulphonates; sugars; molasses; citric acid; citrate-salts; and sulphonates, and/or at least one additive ingredient from a second group of additive ingredients comprising: all alkalis; strong base-strong acid salts; strong base-weak acid salts; lithium salts; lithium compounds; fluoride salts; chloride salts; and sulphonates; and (c) all mixing and adding in (a) and (b) performed in any order in predetermined proportions to yield said intermediate cementitious mixture.

According to the present invention, the cementitious mixture comprises:

(a) a mixture of at least one ingredient from a first basic group of ingredients comprising all sulpho-aluminate cement clinkers and other high alumina cement clinkers, at least one ingredient from a second basic group of ingredients comprising: gypsum; anhydrite; hemihydrate gypsum, and at least one ingredient from a third basic group of ingredients, comprising: lime and hydrated lime; and (b) with a ratio not exceeding 20% by weight of the mixture in (a) at least one additive ingredient from a first group of additive ingredients comprising: tartaric acid; tartarate-salts; boric acid; borate-salts; carbonates; lignosulphates; sugars; molasses; citric acid; citrate-salts; and sulphonates, and/or at least one additive ingredient from a second group of additive ingredients comprising: all alkalis; strong base-strong acid salts; strong base-weak acid salts lithium salts; lithium compounds; fluoride salts; chloride salts; and sulphonates.

BRIEF DESCRIPTION OF THE DRAWINGS

The preferred embodiments of the present invention will now be described in detail in conjunction with the annexed drawings, in which.

DETAILED DESCRIPTION OF THE PREFERRED EMBODIMENTS

Figure 1:
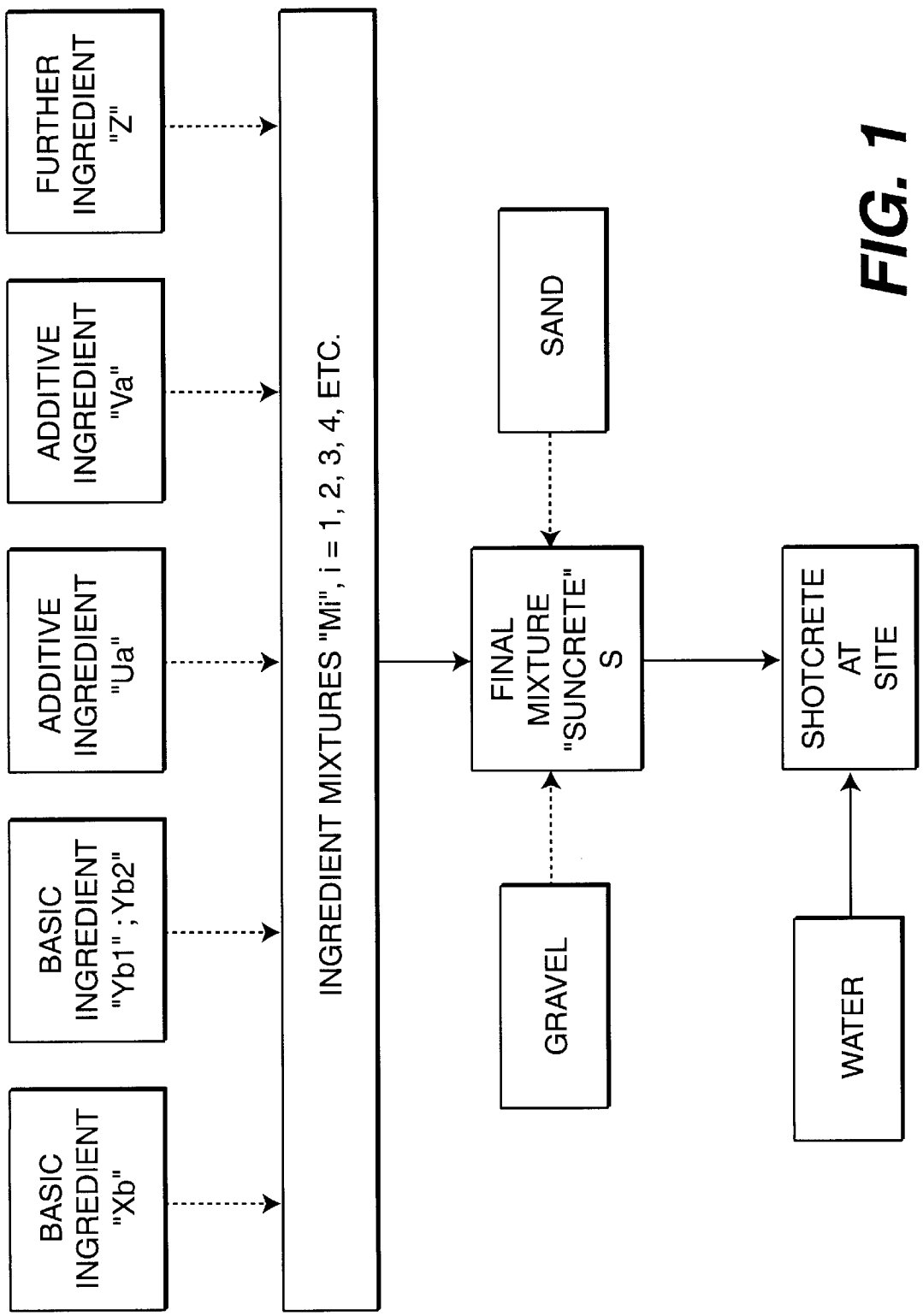
FIG. 1 is an abstract diagram outlining the systematic method of the present invention for making shotcrete.

Referring to FIG. 1 of the drawings, it explains the systematic mixture of the present method. There are five possible different groups of input ingredients; they comprise:

Basic ingredients group "Xb" comprises the class of aluminate cement clinkers, such as sulpho-aluminate cement clinkers, sulpho-ferrite-aluminate cement clinkers, sulpho-fluo-aluminate cement clinkers; all forms of high aluminate cement clinkers;

Basic ingredients group "Yb" comprising two subgroups "Yb1" and Yb2", as follows:
Yb1: gypsum, anhydrite, hemihydrate gypsum; and
Yb2: lime and hydrated lime.

Additive ingredients group "Ua" comprises tartaric acid, tartarate-salts, boric acid, borate-salts; carbonates, lignosulphonates; sugars, molasses, citric acid, citrate-salts, sulphonates;

Additive ingredients group "Va" comprises all alkalis, strong base-strong acid salts, strong base-weak acid salts, lithium salts, lithium compounds, fluoride salts, chloride salts, sulphonates; and Further ingredient group "Z" comprises any member of groups Xb and Yb, bentonite, flyash, silica-powder, ordinary cement, limestone, gypsum, lime. This ingredient group is utilized mainly as mixing help, where necessary, and to improve flow of a mixture prior to combining with water for spraying as shotcrete on site. Sometimes Z is used to adjust setting time, to improve the strength, and to reduce the cost of shotcrete during production and application of the intermediate and final mixtures.

Once the ingredients are mixed together in predetermined proportions to yield, say, a shotcrete with certain specifications, intermediate mixtures result, designated as "M1", "M2", "M3", and so forth. An intermediate mixture yields a final mixture "S" once combined with sand and/or gravel. The final mixture S is then combined with water at the point of spraying as shotcrete on site.

Figure 2:
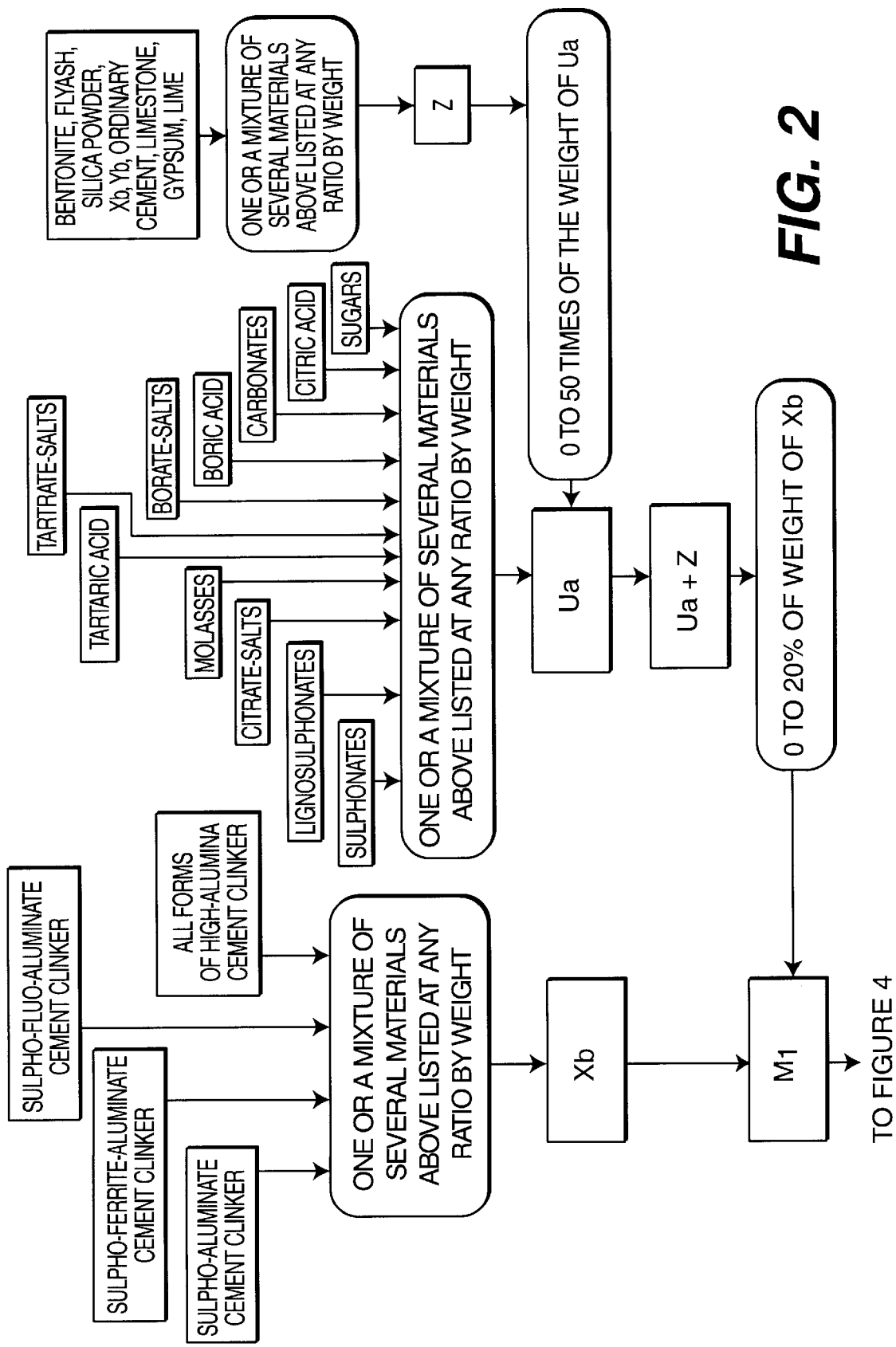
FIG. 2 is a diagram explaining the composition of a first intermediate mixture for making shotcrete according to the present invention.
Figure 3:
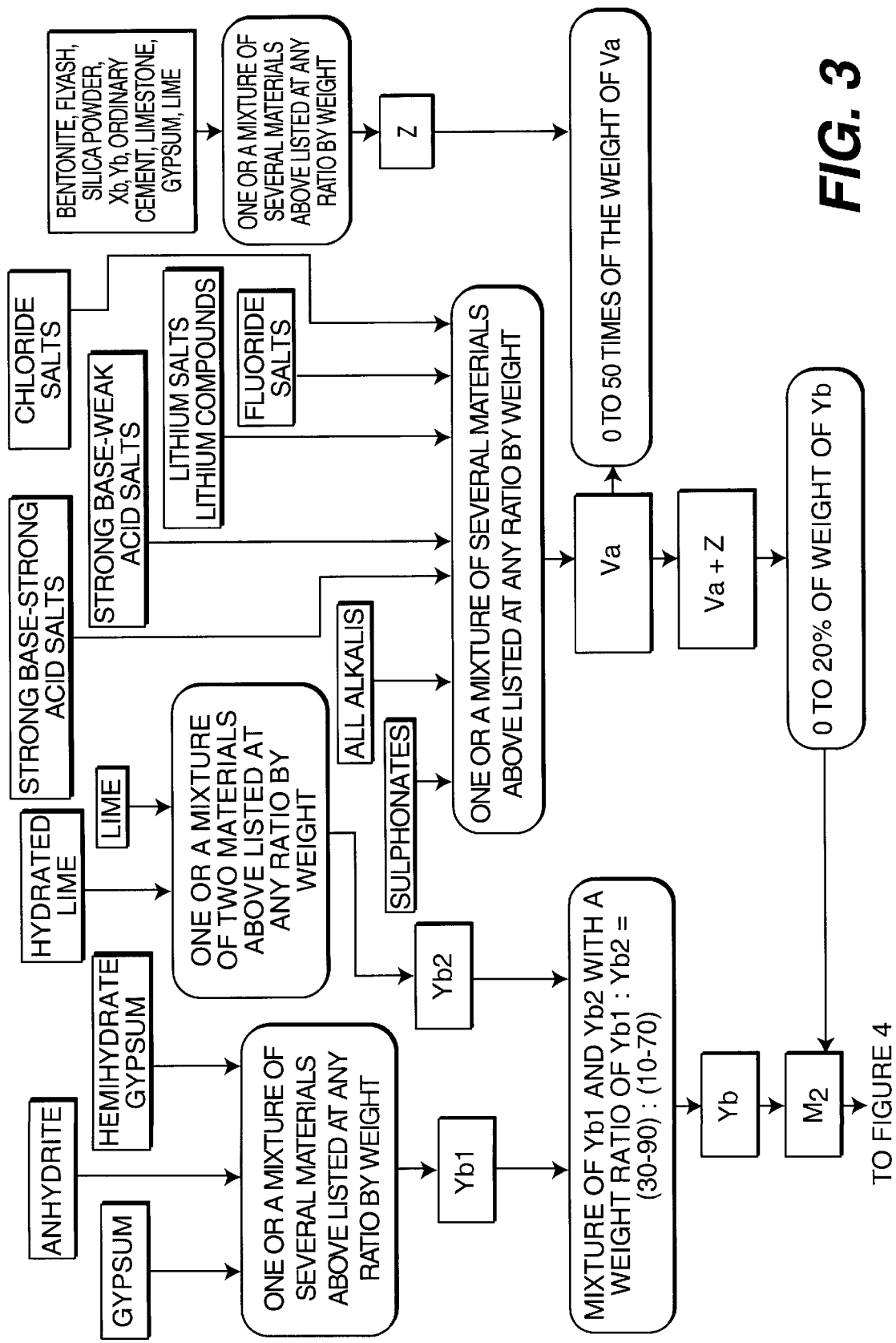
FIG. 3 is a diagram explaining the composition of a second intermediate mixture for making shotcrete according to the present invention.
Figure 4:
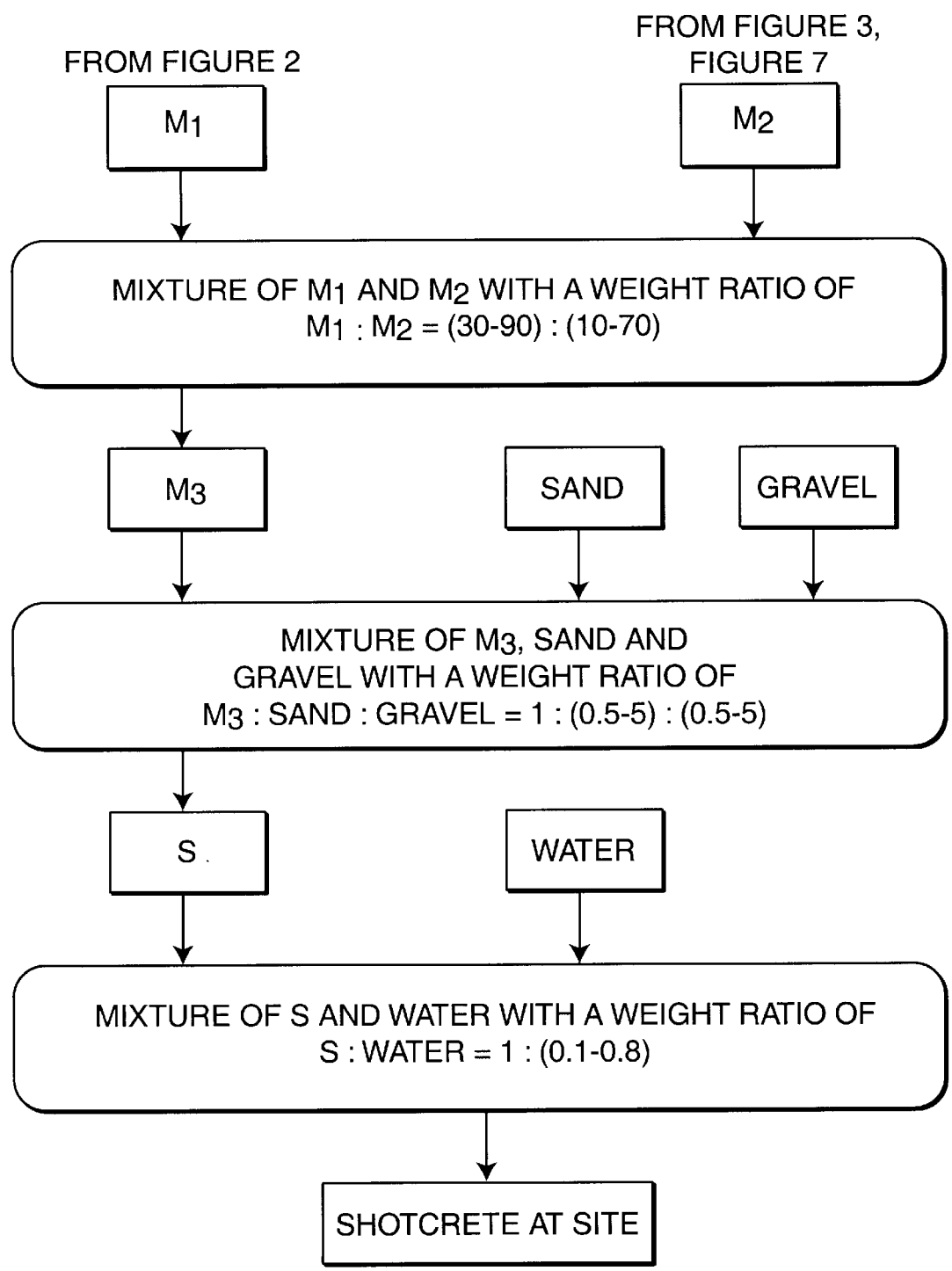
FIG. 4 is a diagram explaining how the intermediate mixtures of FIG. 2 and 3 are combined with sand, gravel and water to produce shotcrete at site.
Figure 5:
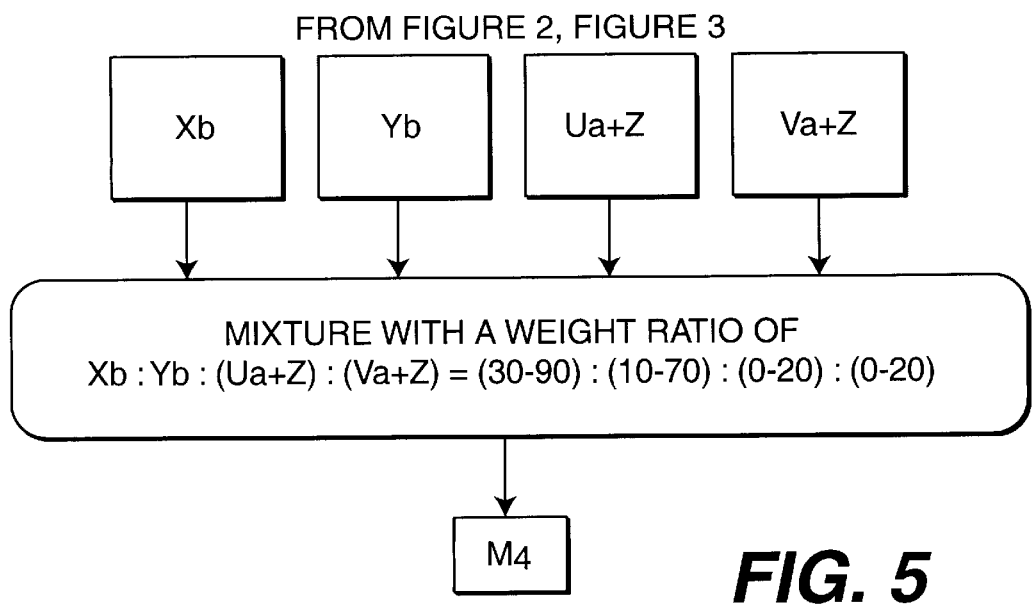
FIG. 5 is an alternative embodiment explaining how to arrive at another intermediate mixture for making shotcrete according to the present invention.
Figure 6:
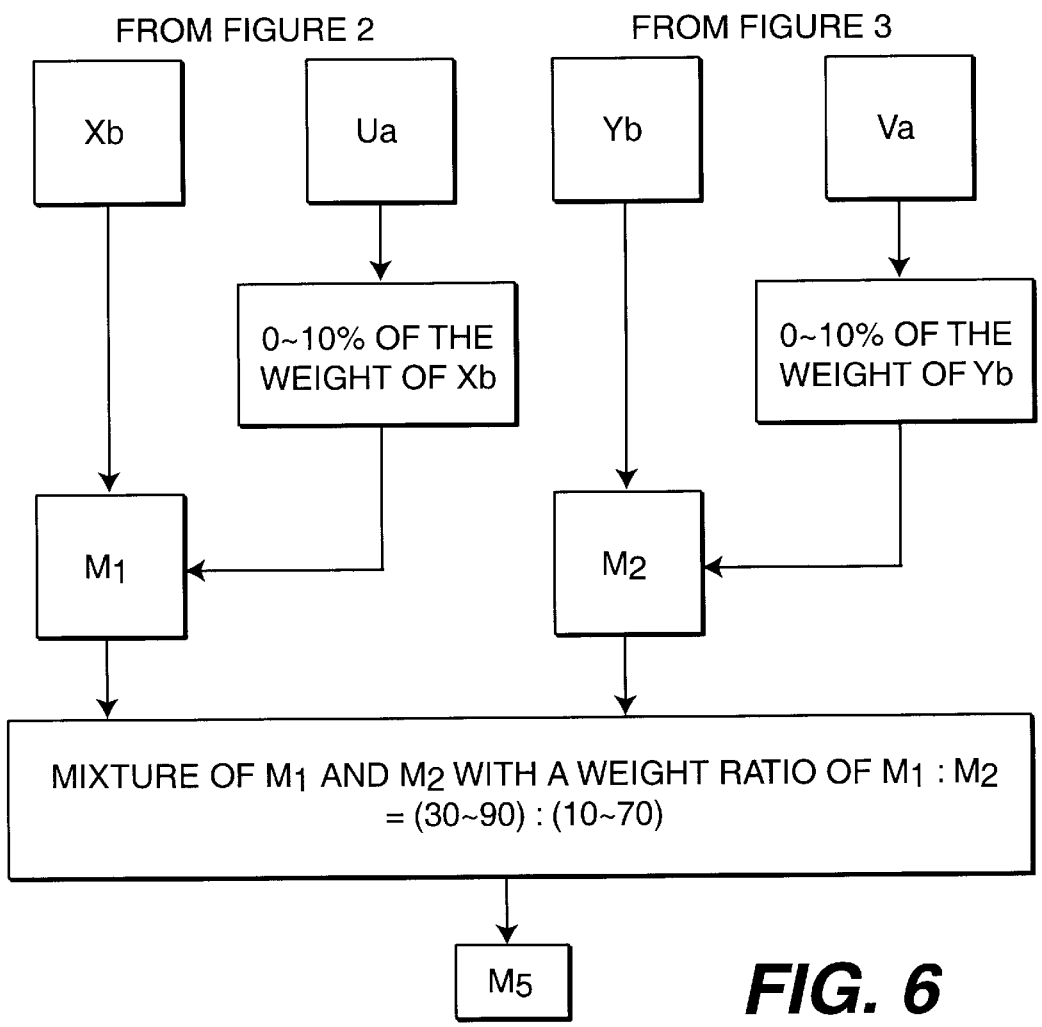
FIG. 6 is yet another alternative embodiment explaining how to arrive at another intermediate mixture for making shotcrete according to the present invention.
Figure 7:
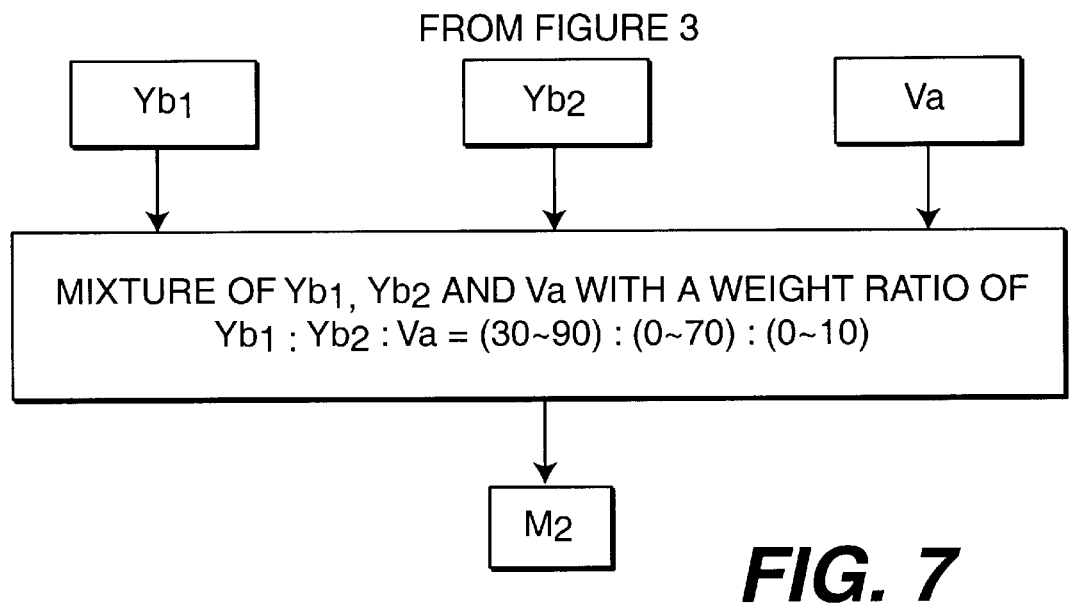
FIG. 7 is yet another alternative embodiment explaining how to arrive at another intermediate mixture for making shotcrete according to the present invention.
Figure 8:
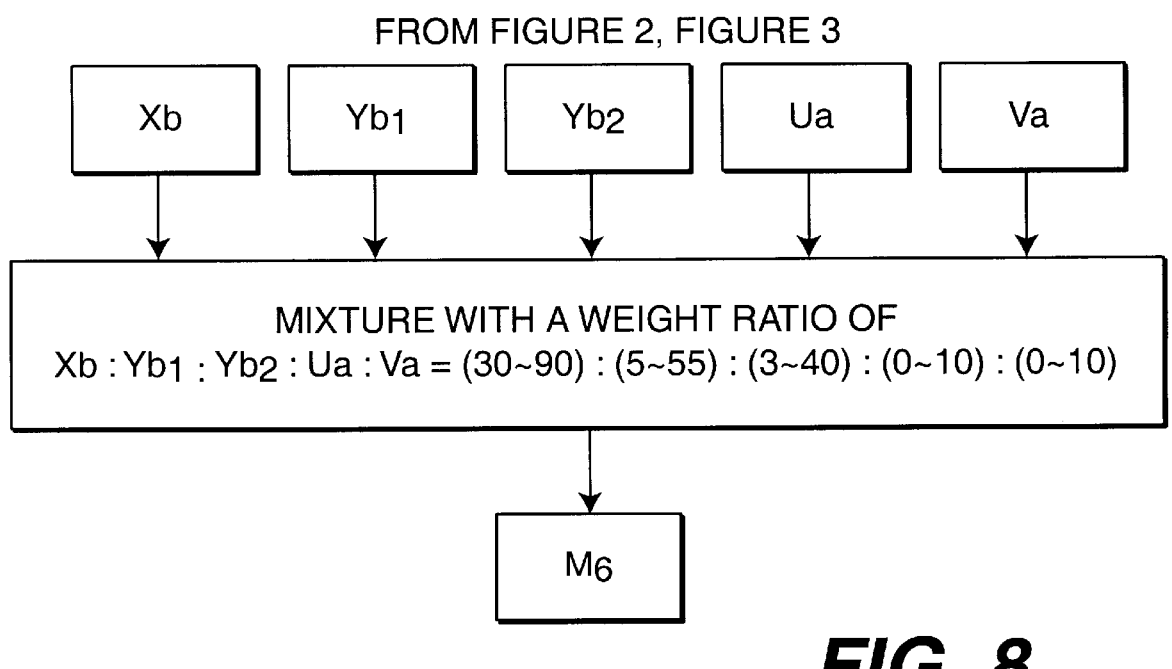
FIG. 8 is yet another alternative embodiment explaining how to arrive at another intermediate mixture for making shotcrete according to the present invention.
Figure 9:
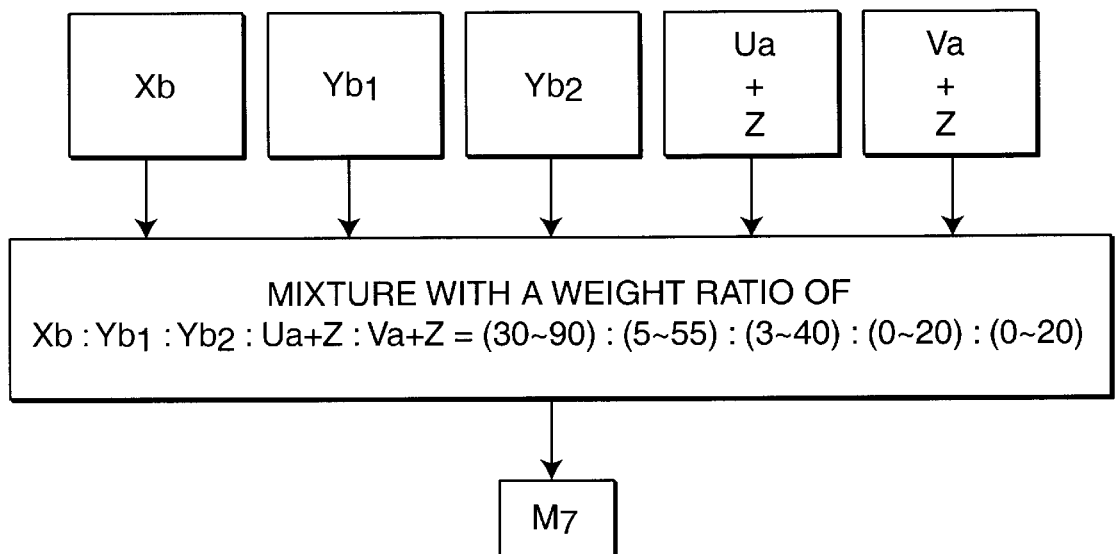
FIG. 9 is yet another alternative embodiment explaining how to arrive at another intermediate mixture for making shotcrete according to the present invention.
Figure 10:
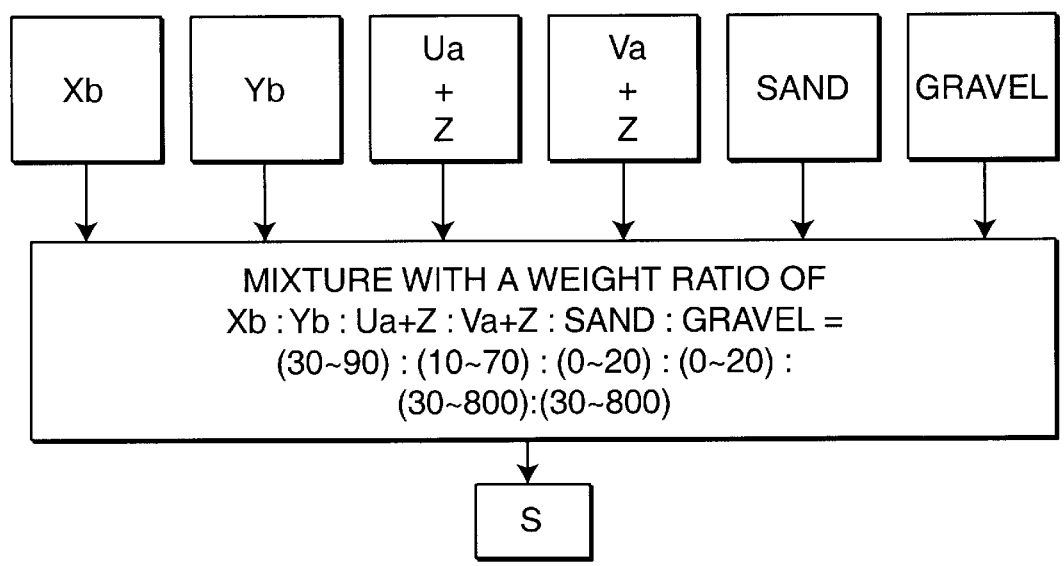
FIG. 10 is an alternative embodiment for making the final mixture (before adding water) according to the present invention.
Figure 11:
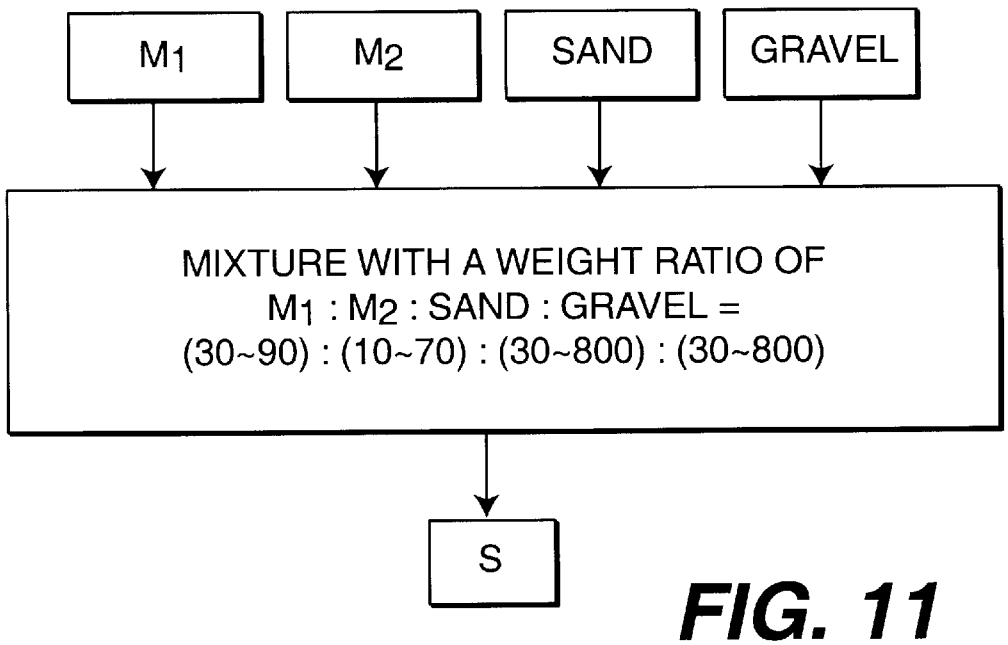
FIG. 11 is yet another alternative embodiment for making the final mixture (before adding water) according to the present invention.
Figure 12:
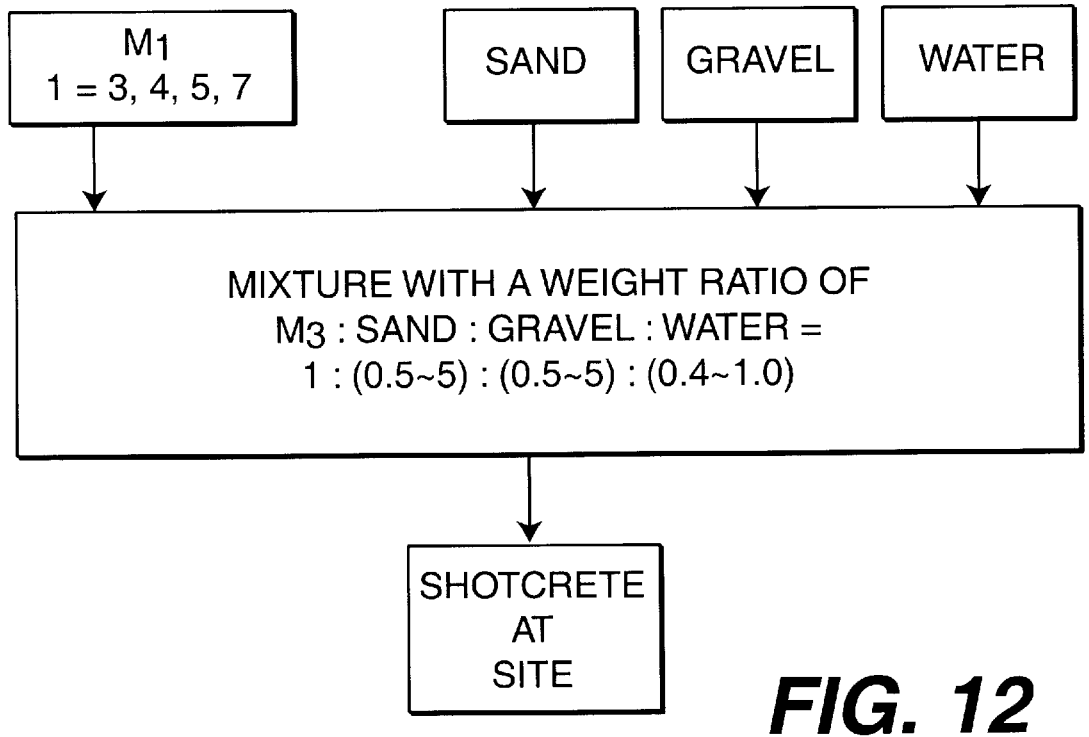
FIG. 12 is an alternative embodiment for producing shotcrete at site from an intermediate mixture, sand, gravel and water.
Figure 13:
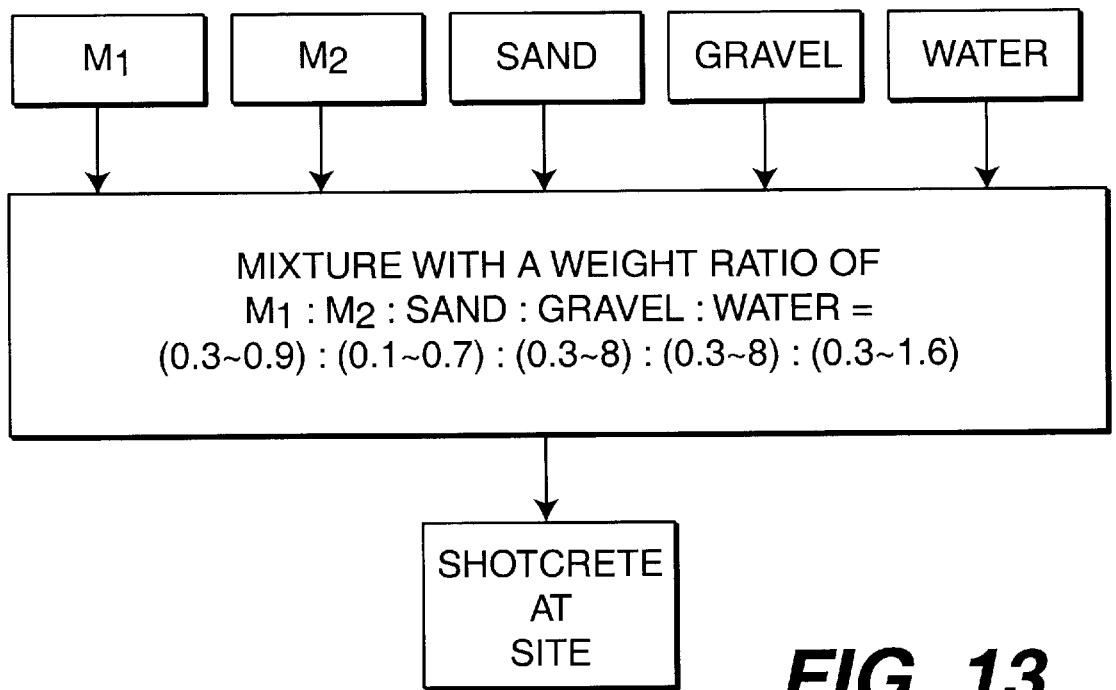
FIG. 13 is yet another alternative embodiment for producing shotcrete at site from two intermediate mixtures, sand, gravel and water.
Figure 14:
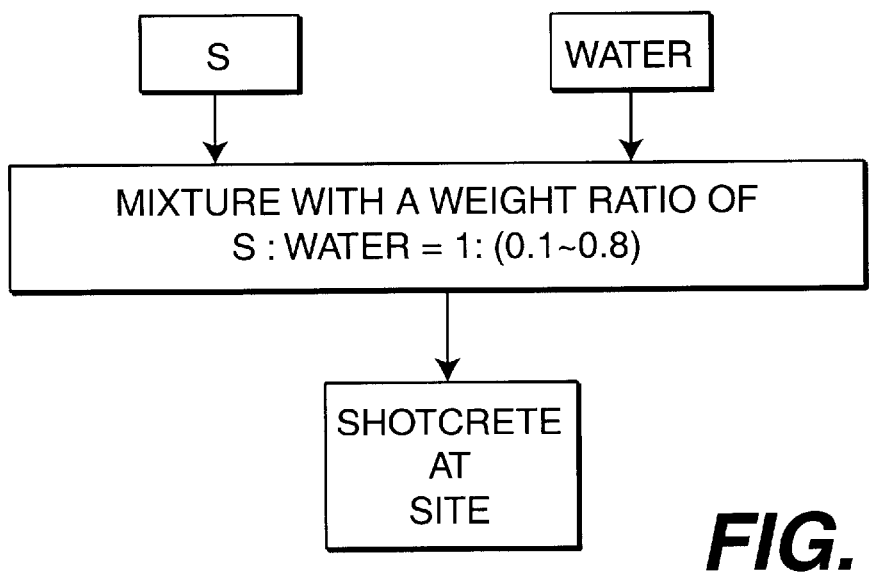
FIG. 14 illustrates productions of shotcrete at site from the final mixture S and water.

FIGS. 2 and 3 explains how the ingredients Xb, Yb, Ua, Va and Z are combined to yield two intermediate mixtures M1 and M2, which themselves are combined as illustrated in FIG. 4 to yield intermediate mixture M3, which is mixed with sand and gravel to yield the final mixture S before adding water at the time of actual spraying of shotcrete. The predominant and usual effects of the various ingredients and additives may be summarized as follows:

Xb—increases long term strength and improves water resistance;

Bb—increases rate of hydration of Xb and speeds up formation of ettringite compounds (important for strength and crystallization) for shotcrete applications;

(Ua+Z)—useful as dispersing agents, retarders and water reducers to adjust setting tires, and improve workability and strength of shotcrete;

(Va+Z)—useful as accelerators for obtaining very short setting times and developing high early strength shotcrete.

In the examples that follow, as well as generally when applying the present methods and compositions, some experimentation may be required in order to obtain results which fall within narrower ranges of variability; and in order to compensate for inevitable variations in the composition of input materials.

The remaining drawings FIGS. 5 to 14 explain different routes for yielding different intermediate and final mixtures; and proportions of the intermediate mixtures and final mixtures to be combined with sand, and/or gravel and water at the point of spraying as shotcrete at site. Such different routes may offer optimal solutions (in terms of cost) depending on the availability, or lack thereof, of various ingredients at manufacturing sites. For example, it is evident that where sand and gravel are available at or near the site where the shotcrete is required, it should be added there to yield the final mixture S close to the site.

Now some quantitative test examples for making the shotcrete are given.

TEST EXAMPLE 1

| | |
|---|---|
| Sulpho-aluminate cement clinker (Xb) | 65 to 80% |
| Gypsum (Yb) | 10 to 20% |
| Lime (Yb) | 5 to 10% |
| Sugar (Ua) | 0.2 to 0.5% |
| Lithium (Va) | 0.5 to 1.0% |

Mixing uniformly and grinding the ingredients together into a fine powder mixture with fineness of 200 mesh, then mixing 1 portion of this mixture with 2.5 portions of sand, 2.5 portions of gravel and 0.55 portion of water, then pouring the slurry into a module of 100 mm×100 mm×100 mm, the following results were obtained in the laboratory:

| Setting time | 5 to 25 minutes |
|---|---|
| Compressive strength: | |
| One hour curing | 5 to 10 MPa |
| Two hours curing | 10 to 20 MPa |
| Six hours curing | 20 to 30 MPa |
| One day curing | 30 to 60 MPa |
| Three days curing | 40 to 80 MPa |
| Twenty eight days curing | 50 to 90 MPa |

The ratio of bending strength to compressive strength was 3.5 to 4.0

The ratio of shear strength to compressive strength was 2 to 2.5

This test example shows properties of quick setting and hardening, high early strength and good toughness, characteristics suitable for shotcrete engineering and technology applications.

TEST EXAMPLE 2

For a shotcrete with binding material having very short setting time and very high early strength, the following recipe is suitable:

| | | (Predominant effect on shotcrete) |
|---|---|---|
| Sulpho-aluminate cement clinker or Sulpho-ferrite-aluminate cement clinker (Xb) | 50 to 70% | (Higher strength) |
| Gypsum or anhydrite (Yb1) | 20 to 35% | (Low shrinkage and increased strength) |
| Lime or hydrated lime (Yb2) | 5 to 20% | (Quickens setting time) |
| Sodium carbonate (Ua) | 0.5 to 2% | (Quickens setting time) |
| Hydrated lithium (Va) | 0.1 to 1% | (Increases strength and decreases setting time) |
| Sodium chloride (Va) | 0.5 to 2% | (Reduces water required) |

Mixing and grinding these ingredients as in test example 1, then mixing with 1 portion of the mixture obtained, 2.5 portions of sand, 2.5 portions of gravel, and 0.6 portion of water, and pouring the slurry into a cylindrical module with a diameter of 7.5 cm and height of 15 cm at 22° C., the following results were achieve:

| Setting time | 1 to 5 minutes |
|---|---|
| Compressive strength: | |
| One hour curing | 5 to 10 MPa |
| Two hours curing | 10 to 20 MPa |
| One day curing | 25 to 50 MPa |
| Three days curing | 30 to 60 MPa |

TEST EXAMPLE 3

A shotcrete with 30 to 40 minutes setting time and 60 to 80 MPa of compressive strength may be achieved by the following composition:

| | |
|---|---|
| Sulpho-aluminate cement clinker or Sulpho-ferrite-aluminate cement clinker (Xb) | 75 to 85% |
| Gypsum or anhydrite (Yb) | 12 to 20% |
| Lime or hydrated lime (Yb) | 2 to 10% |
| Sugar or citric acid (Ua) | 0.1 to 0.4% |

Mixing and grinding these ingredients into fine powder mixture, and then mixing with 1 portion of the mixture obtained with 2 to 3 portions of sands, 2 to 3 portions of gravel, and 0.45 portion of water, and pouring the slurry into a cylindrical module with a diameter 7.5 cm by a height of 15 cm, the following test results were obtained:

| Setting time | 30 to 50 minutes |
|---|---|
| Compressive strength: | |
| Six hours curing | 5 to 10 MPa |
| Twelve hours curing | 25 to 40 MPa |
| One day curing | 35 to 50 MPa |
| Three days curing | 45 to 80 MPa |

In order to make ingredients Xb and Yb uniformly and to decrease the cost of the product for users, some cheaper materials, such bentonite, flyash, silica powder, portland cement, limestone, lime, gypsum, some sludges may be used. Basic and additive ingredients of M1 and of M2, may be selected and used, for example as follows:

| Proportions by weight for (Ua + Z) (See FIG. 2) | |
|---|---|
| Sugar or citric acid or boric acid | 50 to 100 portions |
| Sodium carbonate or sodium sulphonate | 50 to 200 portions |
| Limestone or bentonite or flyash | 5 to 200 portions |
| Proportions by weight for (Va + Z) (See FIG. 3) | |
| Sodium chloride or alkali | 50 to 200 portions |
| Hydrate lithium or lithium chloride | 50 to 200 portions |
| Bentonite or gypsum or lime or cement | 5 to 400 portions |

Other example compositions for intermediate mixtures, suitable for use in shotcrete are given as below. All proportions are by weight.

Example A

| Sulpho-aluminate cement clinker | 60 to 100 portions |
|---|---|
| Gypsum or anhydrite | 20 to 50 portions |
| Lime or hydrated lime | 5 to 20 portions |
| Calcium lignosulphonate | 0.01 to 2 portions |
| Sodium carbonate | 0.05 to 4 portions |

Example B

| Sulpho-ferrite-aluminate cement clinker | 60 to 100 portions |
|---|---|
| Gypsum or anhydrite | 50 to 70 portions |
| Lime or hydrated lime | 10 to 30 portions |
| Molasses | 0.1 to 1.5 portions |
| Sodium carbonate | 0.5 to 3 portions |
| Sodium chloride | 0.1 to 2 portions |
| Hydrate lithium | 0.5 to 2 portions |

Example C

To prepare intermediate mixture M7 (See FIG. 9), proportions by weight are:

| High alumina cement clinker | 50 to 100 portions |
|---|---|
| Gypsum or anhydrite | 20 to 70 portions |
| Hydrated lime or lime | 5 to 40 portions |
| (Ua + Z) | 0 to 4 portions |
| (Va + Z) | 0 to 4 portions |

We claim:

1. A systematic method for producing shotcrete, comprising:
   (a) mixing together (i) at least one ingredient selected from a first basic group of ingredients consisting of sulpho-aluminate cement clinkers, sulpho-ferrite-aluminate cement clinkers and sulpho-fluo-aluminate cement clinkers, (ii) at least one ingredient selected from a second basic group of ingredients consisting of gypsum, anhydrite and hemihydrate gypsum, and (iii) at least one ingredient selected from a third basic group of ingredients consisting of lime and hydrated lime;
   (b) adding to the mixture (a) in an amount not exceeding 20% by weight, based on the weight of mixture (a), (i) at least one additive ingredient selected from a first group of additive ingredients consisting of tartaric acid, tartarate-salts, boric acid, borate-salts, carbonates, lignosulphonates, sugars, molasses, citric acid, citrate-salts, and sulphonates, and/or (ii) at least one additive ingredient selected from a second group of additive ingredients consisting of alkalis, strong base-strong acid salts, strong base-weak acid salts, lithium salts, lithium compounds, fluoride salts, chloride salts and sulphonates;

said mixture further comprising sand or gravel, and water wherein the water is present in an amount of between 10% to 80%, by weight based on the total amount of (a)+(b)+(sand or gravel); and wherein said mixture does not contain either portland cement or high alumina cement clinkers.

2. A shotcrete mixture, comprising:
   (a) a mixture of (i) at least one ingredient selected from a first basic group of ingredients consisting of sulpho-aluminate cement clinkers, sulpho-ferrite-aluminate cement clinkers and sulpho-fluo-aluminate cement clinkers, (ii) at least one ingredient selected from a second basic group of ingredients consisting of gypsum, anhydrite and hemihydrate gypsum, and (iii) at least one ingredient selected from a third basic group of ingredients consisting of lime and hydrated lime;
   (b) up to 20% by weight of the mixture (a), of (i) at least one additive ingredient selected from a group consisting of tartaric acid, tartarate-salts, boric acid, borate-salts, carbonates, lignosulphonates, sugars, molasses, citric acid, citrate-salts and sulphonates, and/or (ii) at least one additive ingredient selected from a group consisting of alkalis, strong base-strong acid salts, strong base-weak acid salts, lithium salts, lithium compounds, fluoride salts, chloride salts and sulphonates;
   (c) sand or gravel; and
   (d) water present in an amount sufficient to provide a weight ratio of water to components (a)+(b) of from 0.4 to 1.0; and wherein the shotcrete mixture does not contain either portland cement or high alumina cement clinkers.

3. A systematic method for producing shotcrete, comprising:
   (a) mixing together (i) at least one ingredient selected from a first basic group of ingredients consisting of sulpho-aluminate cement clinkers, sulpho-ferrite-aluminate cement clinkers and sulpho-fluo-aluminate cement clinkers, (ii) at least one ingredient selected from a second basic group of ingredients consisting of gypsum, anhydrite and hemihydrate gypsum, and (iii) at least one ingredient selected from a third basic group of ingredients consisting of lime and hydrated lime;
   (b) adding to the mixture (a) in an amount not exceeding 20% by weight, based on the weight of mixture (a), (i) at least one additive ingredient selected from a first group of additive ingredients consisting of tartaric acid, tartarate-salts, boric acid, borate-salts, sodium carbonate, lignosulphonates, sugars, molasses, citric acid, citrate-salts, and sulphonates, and/or (ii) at least one additive ingredient selected from a second group of additive ingredients consisting of alkalis, strong base-strong acid salts, strong base-weak acid salts, lithium salts, lithium compounds, fluoride salts, chloride salts and sulphonates;
   (c) adding to the mixture of (a) and (b), either sand, gravel, or sand combined with gravel; and
   (d) adding to the mixture of (a), (b) and (c), water wherein the water is in a proportion ranging from 10% to 80%, by weight of the mixture of (a)+(b)+(c); and optionally (e) adding to the mixture of (a), (b), (c), and (d), at least one of bentonite, flyash, or silica powder; and wherein said mixture does not contain either portland cement or high alumina cement clinkers.

4. A shotcrete mixture, comprising:

(a) a mixture of (i) at least one ingredient selected from a first basic group of ingredients consisting of sulpho-aluminate cement clinkers, sulpho-ferrite-aluminate cement clinkers and sulpho-fluo-aluminate cement clinkers, (ii) at least one ingredient selected from a second basic group of ingredients consisting of gypsum, anhydrite and hemihydrate gypsum, and (iii) at least one ingredient selected from a third basic group of ingredients consisting of lime and hydrated lime;

(b) up to 20% by weight of the mixture (a), of (i) at least one additive ingredient selected from a group consisting of tartaric acid, tartarate-salts, boric acid, borate-salts, sodium carbonate, lignosulphonates, sugars, molasses, citric acid, citrate-salts and sulphonates, and/or (ii) at least one additive ingredient selected from a group consisting of alkalis, strong base-strong acid salts, strong base-weak acid salts, lithium salts, lithium compounds, fluoride salts, chloride salts and sulphonates;

(c) sand, gravel or sand combined with gravel; and (d) water present in an amount sufficient to provide a weight ratio of water to components (a)+(b) of from 0.4 to 1.0; and optionally (e) at least one of bentonite, flyash, or silica powder; and wherein said mixture does not contain either portland cement or high alumina cement clinkers.

\* \* \* \* \*